United States Patent [19]

Kuan et al.

[11] Patent Number: 4,833,194

[45] Date of Patent: May 23, 1989

[54] ELASTOMERIC THERMOPLASTIC COMPOSITIONS

[75] Inventors: Jeremy T. H. Kuan, Hudson; Mary E. Hopkins, Parma Heights; Richard S. Varga, Akron, all of Ohio

[73] Assignee: R.J.F. International Corporation, Brecksville, Ohio

[21] Appl. No.: 120,064

[22] Filed: Nov. 13, 1987

[51] Int. Cl.$^4$ .................. C08K 3/00; C08K 3/08; C08K 3/26

[52] U.S. Cl. .................... 524/525; 524/413; 524/426; 524/427; 524/445; 525/211; 525/232; 525/236; 525/240

[58] Field of Search .......... 525/232, 211, 240, 236; 524/525, 426–427, 413, 445

[56] References Cited

U.S. PATENT DOCUMENTS

| | | | |
|---|---|---|---|
| 4,088,713 | 5/1978 | Herman et al. | 525/233 |
| 4,128,523 | 12/1978 | Britton et al. | 525/232 |
| 4,204,024 | 5/1980 | Pye | 524/432 |
| 4,247,661 | 1/1981 | Herman et al. | 525/240 |
| 4,251,646 | 2/1981 | Smith | 525/240 |
| 4,311,628 | 1/1982 | Sabet et al. | 525/232 |
| 4,319,004 | 3/1982 | Spielav et al. | 525/211 |
| 4,363,885 | 12/1982 | Fukui et al. | 525/89 |
| 4,412,016 | 10/1983 | Fukui et al. | 525/89 |
| 4,439,573 | 3/1984 | Fukui et al. | 524/505 |
| 4,459,380 | 7/1984 | Vostovich | 524/519 |
| 4,588,775 | 5/1986 | McCullough | 525/240 |

*Primary Examiner*—Herbert J. Lilling
*Attorney, Agent, or Firm*—Daniel J. Hudak Co.

[57] ABSTRACT

Blends of crystalline and amorphous polymers are utilized to form uncured thermoplastic elastomer compositions which have good properties such as processability, tensile strength, tear strength, good weatherability, good friction, and especially low deformation at high temperatures as about 180° F. The thermoplastic elastomer composition contains amorphous ethylene-propylene type rubber, crystalline ethylene-propylene type rubber, and crystalline olefins such as polyethylene. The crystalline polymers generally impart the necessary thermoplasticity for melt processing, and the like.

26 Claims, No Drawings

ELASTOMERIC THERMOPLASTIC COMPOSITIONS

FIELD OF THE INVENTION

The present invention relates to thermoplastic elastomer compositions having low deformation or creep at high temperatures which are made from amorphous as well as crystalline ethylene-propylene type rubbers and crystalline polymers made from olefins such as polyethylene.

BACKGROUND ART

Heretofore, various thermoplastic elastomers have been known. One such type is essentially a styrene-butadiene-styrene block copolymer manufactured by Shell under the brand name Kraton. Such copolymers generally have unsuitable high heat distortion and weatherability which limit their use as roofing membranes, matting, and the like.

Another type of thermoplastic elastomer is the various Santoprenes made by Monsanto which are generally blends of cured ethylene-propylene-diene rubbers with polypropylene. Such compounds generally have unsuitable adhesion and a low coefficient of friction for use as matting, roofing, membranes, and the like.

SUMMARY OF THE INVENTION

The thermoplastic elastomer compositions contain an amorphous ethylene-propylene type elastomer such as ethylene-propylene copolymer (EPR) or ethylene-propylene diene terpolymer (EPDM) wherein the amount of ethylene is less than 65 percent by weight and preferably less than 63 percent by weight of ethylene based upon the total weight of the ethylene and the propylene. The crystalline ethylene-propylene type elastomer such as EPR or EPDM contains at least 60 percent ethylene and preferably at least 65 percent ethylene by weight based upon the total weight of the ethylene and the propylene units. That is, the above percent amounts or ranges refer to the weight percent of ethylene units based upon the total amount of ethylene and propylene units in the ethylene-propylene type elastomers such as ethylene-propylene copolymers or ethylene-propylene-diene terpolymers. As used herein, an amorphous ethylene-propylene type elastomer is generally defined as having no ordered structure, as determined by a thermoanalytical device such as a differential scanning calorimeter (i.e. no detectable peaks or valleys) at a temperature of from about 20° C. to about 150° C. Inasmuch as the structure defines whether the elastomer is amorphous or crystalline, the amount of ethylene content in the crystalline or amorphous polymer can overlap. A major amount of the crystalline type elastomer and a minor amount of the amorphous type elastomer is generally utilized in the thermoplastic elastomer composition. Effective amounts of a crystalline polymer such as polyethylene are blended with the amorphous and crystalline elastomers so that a thermoplastic elastomer composition or blend is produced having good physical properties including high friction (sliding resistance), and low deformation (creep) at high temperatures, i.e. about 180° F. Processing aids and plasticizers are desirably utilized to reduce viscosity of the composition so that it is readily processed. Various fillers such as various clays, various silicas, calcium carbonate, carbon blacks and the like, can be utilized to favorably alter melt flow behavior and for modulus enhancement and other effects.

DETAILED DESCRIPTION OF THE INVENTION

The compositions of the present invention are based on blends of crystalline and amorphous polymers such as ethylene-propylene type elastomers. A crystalline olefin such as polyethylene is also utilized to obtain good strength at ordinary service temperatures and especially low deformation or creep at high temperatures. Unsaturation in the polymer main chain is minimized to reduce the tendency of oxidative degradation to occur. The presence of a crystalline polymer in the composition imparts thermoplasticity desirable for processing. It also functions as crosslinked junctions, imparting the high elasticity and strength needed at ordinary use temperatures. At exceedingly high temperatures, these crystalline domains melt but will reform on cooling below its melting point. Accordingly, the crystalline polymers should have a melt temperature which is well above the highest temperature which would be encountered in use of the processed composition or blend of the present invention.

The ethylene-propylene type amorphous and crystalline elastomers are generally similar except for the amount of ethylene contained therein. The crystalline ethylene-propylene type elastomers generally have at least 60 percent by weight of ethylene units therein (i.e., from ethylene monomers) based upon the total weight of the ethylene and propylene units. Desirably, the crystalline elastomer has 65 percent or greater by weight of ethylene units therein. The weight ratio of ethylene repeating units to propylene units in the crystalline ethylene-propylene polymer is thus about 1.5 or greater and desirably 1.85 or greater. The amorphous ethylene-propylene type elastomer generally has less than 60 percent by weight of ethylene units therein based upon the total weight of the ethylene and propylene units and generally less than 63 percent by weight. Thus, the weight ratio of the ethylene to propylene units is less than 1.85 and preferably 1.70 or less.

Ethylene-propylene type elastomers which can be utilized in the present invention include ethylene-propylene rubber (EPR), ethylene-propylene-diene rubber (EPDM), and the like. EPDM contains small amounts of non-conjugated diene units pendent to the main chain. That is, EPDM is made from monomers of ethylene, propylene, and non-conjugated dienes having from about 5 to about 10 carbon atoms with from about 6 to about 9 being preferred. Examples of specific non-conjugated dienes include pentadiene, hexadiene, norbornene, methylnorbornene, ethylidenenorbornene, dicyclopentadiene, and the like, with norbornene and dicyclopentadiene being desired, and a hexadiene such as 1,4-hexadiene being preferred. The amounts of the non-conjugated diene compound utilized in making EPDM is from about 0.1 to about 10 percent by weight and preferably from about 1 to about 4 percent by weight based upon the total weight of the monomers, that is the ethylene, the propylene, and the non-conjugated diene monomers.

The amount of crystalline ethylene-propylene type elastomer utilized is generally a majority as from about 55 percent to about 95 percent by weight and preferably from about 60 to about 85 percent by weight based upon a blend of the crystalline and the amorphous ethylene-propylene type elastomers. Correspondingly, the amount of the amorphous ethylene-propylene type elastomer utilized in the amorphous and crystalline ethylene-propylene type elastomer blend is from about 5 percent to about 45 percent by weight and preferably from about 15 to about 40 percent by weight.

The molecular weight of the amorphous and crystalline ethylene-propylene type elastomers is generally measured by Mooney viscosity, i.e., Mooney(1+4) at 125° C. The Mooney viscosity of the amorphous polymer is generally from about 15 to about 85 with from about 20 to about 80 being desired, whereas the Mooney viscosity of the crystalline polymer is from about 15 to about 85, with from about 20 to about 80 being preferred.

Inasmuch as ethylene-propylene-diene rubbers have good properties including low deformation and/or creep at high temperatures, they are preferred. Since, the ethylene-propylene rubbers lack good high temperature heat deflection, they are not preferred but are still suitable for use in the present invention. The Mooney viscosity of the amorphous and crystalline ethylene-propylene type elastomers along with the high temperature melting point crystalline polymers are such that the thermoplastic elastomer composition or blend typically does not flow at high temperatures as at 180° but is easily processable, that is will flow, at much higher temperatures as from about 300° to about 400° F. Thus, the blend of the above three noted components produces a true thermoplastic elastomer composition.

The crystalline polymers made from olefins are utilized in an effective amount to yield a composite or blend having desired properties such as low deformation or creep at high temperatures. Such effective amounts are generally from about 2 to about 45 parts by weight, desirably from about 5 to about 35 parts by weight, and preferably from about 10 to about 25 parts by weight based upon 100 parts by weight of the crystalline and amorphous ethylene-propylene type elastomer blend. Examples of suitable crystalline polymers derived from olefin monomers include ethylene-vinyl acetate copolymers, chlorinated polyethylene, polyvinyl chloride, polypropylene, and preferably polyethylene. These thermoplastic polymers generally have high melting points so that they impart the thermoplasticity necessary for processing, formation of physical cross-linked sites, and the like to the composite. Naturally, the melting temperature of the crystalline polymer will generally vary with molecular weight, but generally is at least 185° F., desirably at least 190° F., and preferably 220° F. The polyethylene can generally have any density including high or low densities. If small amounts of the crystalline are utilized, generally a high density polyethylene is utilized since it has a higher crystallinity.

It is an important aspect of the present invention to utilize various compatible processing aids and plasticizers such as oils, inasmuch as the viscosity of the thermoplastic elastomer compositions or blends are generally high. The plasticizer has been found to dramatically reduce the viscosity so the blend can be easily processed. Suitable compatible plasticizers are the various paraffinic oils as well as such paraffinic oils containing approximately 50 percent by weight or less of aromatic oils therein. Generally, any conventional paraffinic or paraffinic-aromatic blend of oil can be utilized as well as those known to the art and to the literature. The amount of such oils is usually from 0 or 1 to about 100 parts by weight and desirably from about 10 to about 30 parts by weight for every 100 parts by weight of the above three noted polymer components which form the thermoplastic elastomer composition. Processing aids which can be utilized include metal fatty acid salts and/or amides.

Various conventional additives can be utilized in conventional amounts, such as various fillers, various antioxidants, various reinforcement agents, various viscosity modifiers, and the like. Generally the fillers can be the same as those utilized with regard to EPR or EPDM and include various clays, calcium carbonate, various silicas, reclaimed rubber, titanium dioxide, carbon black, and the like. The amount of fillers is generally quite large and can range from about 50 to about 400 parts by weight and preferably from about 75 to about 300 parts by weight per every 100 parts by weight of the amorphous and crystalline ethylene-propylene type polymers as well as the crystalline polyethylene. Various conventional antioxidants and antiozonates known to the art and to the literature can also be utilized. When calcium carbonate is utilized, the amount of antioxidant is generally increased, whereas if carbon black is utilized, the amount of antioxidant is generally decreased. Carbon black is often utilized as a reinforcing agent to provide enhanced modulus and increased resistance to fatigue failure and tear. Particle size of the carbon black is generally from about 19 to about 40 millimicrons and has a surface area of from about 60 to about 150 meters$^2$ per gram (nitrogen absorption test) or from about 60 to about 150 cc/100 gram (DBP absorption). The amount of carbon black can generally vary from 0 or 1 to about 100 parts by weight per 100 parts by weight of the amorphous or crystalline polymers.

An optional aspect of the present invention is to utilize various curatives such as sulfur, sulfur donors and peroxides. Alternatively, the polymer composite can be cured utilizing an electronic beam. However, curing of the composite is not desired.

The crystalline or amorphous polymers are blended, along with any processing aids and the various additives in any conventional type of apparatus and can be utilized as such, that is as a powder mixture, and applied to an apparatus for making a final product, e.g., an extruder. However, the composition is desirably melt-blended and subsequently utilized as such as in pellet, granular, etc. form. That is, the amorphous and crystalline ethylene-propylene type elastomers, the crystalline polymer such as polyethylene, the processing aids and the various additives are added to any suitable mixing device such as a Banbury, a two-roll mill, and the like wherein the crystalline polymer and the crystalline ethylene-propylene type elastomers are melted and blended with the remaining components. In order that the melt processed thermoplastic elastomer blend can be adequately stored, shipped and subsequently utilized, it can be prepared in a suitable form as by pelletizing, granulating, and the like. Inasmuch as the compositions or blends of the present invention are desirably uncured, they can be melt-processed a plurality of times.

Once the thermoplastic elastomer composition has been melt-processed, it has good processing properties as for extruding, injection molding, etc., and good physical properties such as good tensile strength, good tear strength, good weather aging, as for example as against oxidation and/or ozonization, high friction, improved puncture resistance, and especially low creep or deformation at high temperatures. The compositions or melt processed blends of the present invention generally have a heat deformation at 180° F. at 10 minutes of 0.060 inch or less, desirably 0.030 inch or less, and preferably 0.015 inch or less. Uses of the compositions or melt-processed blends of the present invention thus include situations in which such properties are desired. Specific examples include roofing membranes, rooftop walkway pads, matting, weather stripping, and the like.

The invention will be better understood by reference to the following examples.

EXAMPLES

The following formulations were utilized.

|  | I | II | III |
|---|---|---|---|
| Nordel 2760 (a crystalline ethylene-propylene-diene rubber) | — | 70 | 60 |
| Nordel 2744 (a crystalline ethylene-propylene-diene rubber) | 25 | — | — |
| Nordel 1070 (an amorphous ethylene-propylene-diene rubber) | 25 | 20 | 20 |
| Vistalon 707 (a semi-crystalline ethylene-propylene rubber) | 50 | — | — |
| Petrothene/Na 208 (a low density polyethylene) | — | 10 | 15 |
| Titanium Dioxide | 10 | 10 | — |
| Calcium Carbonate | 250 | 250 | 125 |
| Clay | — | — | 25 |
| Furnace carbon black (HAF HS) | — | — | 15 |
| Petroleum-based plasticizer | 3 | 3 | 27.5 |
| A Metallic fatty acid salt | — | 1 | 1 |
| Stearic Acid | — | 1 | — |
| A Phosphite heat stabilizer | 0.1 | 0.1 | .1 |
| A Phenolic antioxidant | 0.1 | 0.1 | .1 |
| A Benzotriazole Ultraviolet light absorber | 0.2 | 0.2 | .2 |
| Total Parts | 363.6 | 365.4 | 288.9 |
| Sp. Gravity | 1.69 | 1.69 | 1.40 |
| Stress/Strain Properties in Simple Extension: |  |  |  |
| Elongation (%) | >1000 | 761 | 810 |
| Tensile Strength (lb/in$^2$) | 363 | 759 | 1660 |
| Shore A Hardness (±01) | 67 | 78 | 73 |
| Die C Tear (lb/in) | 82 | 116 | 135 |

Weather Aging (accelerated intense UV/IR test) Simulation Test:
Days of aging    19           29
Observation      surface      medium
                 cracks       cracks The above formulations were tested with regard to high temperature deformation as well as wet and dry friction. The following results were obtained.

| Heat Deformation (HD) @ 180° F. (5.2 lb /0.196 in$^2$ = 26.48 psi) | | |
|---|---|---|
|  | H.D. (Inch) | |
| EXAMPLE No. | @ 5 min. | @ 10 min. |
| Kraton D (54-001D) | .022 | .028 |
| I | .052 | .075 |
| II | .009 | .010 |
| III | .010 | .012 |

Both Example II and Example III contain physical crosslinks due to the crystalline polyethylene domains. Their presence obviously has a significant effect on the resistance to heat deformation of the final compounds, as indicated above. Inasmuch as the Kraton Example and Example I did not contain any crystalline polyethylene polymer, it had poor heat deformation properties. Thus, it is apparent from Example I, which functions as a control, that a large reduction in heat deformation was obtained.

The heat deformation test consisted of applying a known normal load on top of a sheet of the example formulation and measuring the sample deformation as a function of time. Sufficient time was allowed for the set up to reach thermal equilibrium before measurements were taken. The force and the cross section of the loader used simulated approximately a 180 lb. person walking on top of the sheet.

| Friction Property Aluminum Shoe Sliding on The Sheet | | |
|---|---|---|
|  | Friction Coefficients | |
| Example No. | Dry | Wet |
| III | 0.62 | 0.51 |
| Kraton D (54-001D) | 0.26 | 0.34 |

The above results show that the disclosed EPDM/PE based compound resisted sliding much more effectively than the Kraton based compound.

The measurements were made with a track and slider set up attached to the Instron. The sheet substrate, measuring about 8″×4″ in surface area was tacked onto the track surface. The aluminum slider moved across the sheet through vertical displacement of the Instron. Other conditions of measurements included:

Normal Load = 4.5 Kg
Sliding Speed = 25.4 cm/minute

While in accordance with the patent statutes, the best mode and preferred embodiment has been set forth, the scope of the invention is not limited thereto, but rather by the scope of the attached claims.

What is claimed is:

1. A blend of amorphous and crystalline polymers having low deformation at high temperatures, comprising:

from about 5 percent to about 45 percent by weight of an amorphous ethylene-propylene elastomer having less than 65 percent by weight of ethylene therein based upon the total weight of the ethylene and the propylene, from about 55 percent to about 95 percent by weight of a crystalline ethylene-propylene elastomer having at least 60 percent by weight of ethylene therein based upon the total weight of the ethylene and the propylene, and from about 2 parts to about 45 parts by weight of a crystalline polymer made from an olefin monomer for every 100 parts by weight of said crystalline and said amorphous ethylene-propylene elastomers, said crystalline polymer made from an olefin monomer having a melting temperature of at least 190° F., and the blend having a heat-deformation at 180° F. at 10 minutes of 0.06 inches or less.

2. A blend of amorphous and crystalline polymers according to claim 1, wherein said amorphous ethylene-propylene elastomer has less than 65 percent by weight therein of ethylene units based upon the total number of ethylene and propylene units therein, and wherein said crystalline ethylene-propylene elastomer has 60 percent by weight or greater of ethylene units therein based upon the total number of ethylene and propylene units therein.

3. A blend of amorphous and crystalline polymers according to claim 2, wherein said amorphous and said crystalline ethylene-propylene elastomers are an ethylene-propylene rubber or an ethylene-propylene-diene rubber, wherein the amount of said diene units in said ethylene-propylene-diene rubber is from about 0.1 to about 10 percent by weight based upon the total weight of said ethylene-propylene-diene rubber, wherein said diene repeating unit is made from a non-conjugated monomer having from 5 to 10 carbon atoms, and wherein said crystalline polymer made from an olefin monomer is an ethylene-vinyl acetate copolymer, a chlorinated polyethylene, polypropylene, polyethylene, or combinations thereof, and wherein said crystalline polymer made from an olefin monomer has a melting temperature of at least 220° F.

4. A blend of amorphous and crystalline polymers according to claim 3, and optionally including from about 50 to about 400 parts by weight of a filler for every 100 parts by weight of said amorphous and crystalline ethylene-propylene elastomers.

5. A blend of amorphous and crystalline polymers according to claim 3, wherein said amorphous ethylene-propylene elastomer contains less than 63 percent by weight of ethylene units therein based upon the total number of ethylene and propylene units therein, wherein said crystalline ethylene-propylene elastomer contains at least 65 percent by weight of ethylene units therein based upon the total number of ethylene and propylene units therein, wherein the amount of diene in said ethylene-propylene-diene rubber is from about 1 percent to about 4 percent by weight based upon the total weight of said ethylene-propylene-diene rubber, and wherein the amount of said crystalline polymer made from an olefin monomer is from about 5 parts to about 35 parts by weight for every 100 parts by weight of said amorphous and said crystalline ethylene-propylene elastomers.

6. A blend of amorphous and crystalline polymers according to claim 5, said amorphous and said crystalline ethylene-propylene elastomer being said ethylene-propylene-diene rubber, wherein the amount of said amorphous ethylene-propylene-diene rubber is from about 15 percent to about 40 percent by weight, wherein the amount of said crystalline ethylene-propylene-diene elastomer is from about 60 percent to about 85 percent by weight, and wherein said crystalline polymer made from an olefin monomer is polyethylene.

7. A blend of amorphous and crystalline polymers according to claim 1, including from about 50 to about 400 parts by weight of a filler for every 100 parts by weight of said amorphous and crystalline ethylene-propylene elastomers and said crystalline polyethylene.

8. A blend of amorphous and crystalline polymers according to claim 5, including from about 50 to about 400 parts by weight of a filler for every 100 parts by weight of said amorphous and crystalline ethylene-propylene elastomers and said crystalline polyethylene.

9. A blend of amorphous and crystalline polymers according to claim 6, including from about 50 to about 400 parts by weight of a filler for every 100 parts by weight of said amorphous and crystalline ethylene-propylene elastomers and said crystalline polyethylene.

10. A thermoplastic elastomer composition, comprising:
a melt processed blend of a crystalline polymer made from an olefin monomer, a crystalline ethylene-propylene elastomer having at least 60 percent by weight of ethylene therein based upon the total weight of the ethylene and the propylene, and an amorphous ethylene-propylene elastomer having less than 65 percent by weight of ethylene therein based upon the total weight of the ethylene and the propylene, the amount of said amorphous ethylene-propylene elastomer being from about 5 percent to about 45 percent by weight based upon the weight of said amorphous ethylene-propylene elastomer and said crystalline ethylene-propylene elastomer, the amount of said crystalline ethylene-propylene elastomer being from about 55 percent to about 95 percent by weight based upon said amorphous ethylene-propylene elastomer and said crystalline ethylene-propylene elastomer, wherein said crystalline polymer made from olefin monomer has a melting temperature of at least 190° F., and the amount of said crystalline polymer made from said olefin monomers being an effective amount so that said melt processed blend has a low deformation at 180° F. for 10 minutes of 0.060 inch or less.

11. A thermoplastic elastomer composition according to claim 10, wherein said amorphous and said crystalline ethylene-propylene elastomer is an ethylene-propylene rubber, an ethylene-propylene-diene rubber, or combinations thereof wherein the amount of said diene units in said ethylene-propylene-diene rubber is from about 0.1 to about 10 percent by weight based upon the total weight of said ethylene-propylene-diene rubber, and wherein said diene repeating unit is made from a non-conjugated monomer having from 5 to 10 carbon atoms.

12. A thermoplastic elastomer composition according to claim 11, wherein said crystalline polymer made from an olefin monomer is an ethylene-vinyl acetate copolymer, a chlorinated polyethylene, polypropylene, polyethylene, or combinations thereof.

13. A thermoplastic elastomer composition according to claim 12, wherein said amorphous ethylene-propylene elastomer has less than 65 percent by weight therein of ethylene units based upon the total number of ethylene and propylene units therein, and wherein said crystalline ethylene-propyleneelastomer has 60 percent by weight or greater of ethylene units therein based upon the total number of ethylene and propylene units therein.

14. A thermoplastic elastomer composition according to claim 13, wherein said amorphous ethylene-propylene elastomer contains less than 63 percent by weight of ethylene units therein based upon the total number of ethylene and propylene units therein, wherein said crystalline ethylene-propylene elastomer contains at least 65 percent by weight of ethylene units therein based upon the total number of ethylene and propylene units therein, wherein the amount of diene in said ethylene-propylene-diene rubber is from about 1 percent to about 4 percent by weight based upon the total weight of said ethylene-propylene-diene rubber, wherein the amount of said crystalline polymer made from an olefin monomer is from about 5 parts to about 35 parts by weight for every 100 parts by weight of said amorphous and said crystalline ethylene-propylene elastomers, and wherein said crystalline polymer made from an olefin monomer has a melting temperature of at least 220° F.

15. A thermoplastic elastomer composition according to claim 14, said amorphous and said crystalline ethylene-propylene elastomer is said ethylene-propylene-diene rubber, wherein the amount of said amorphous ethylene-propylene-diene rubber is from about 15 percent to about 40 percent by weight, wherein the amount of said crystalline ethylene-propylene-diene rubber is from about 60 percent to about 85 percent by weight, and wherein said crystalline polymer made from an olefin monomer is polyethylene.

16. A thermoplastic elastomer composition according to claim 13, wherein said low deformation at 180° F. for 10 minutes is 0.030 inch or less.

17. A thermoplastic elastomer composition according to claim 15, wherein said low deformation at 180° F. for 10 minutes is 0.015 inch less.

18. An uncured matting comprising the composition of claim 10.

19. An uncured matting comprising the composition of claim 14.

20. An uncured roofing membrane comprising the composition of claim 10.

21. An uncured roofing membrane comprising the composition of claim 15.

22. A thermoplastic elastomer composition according to claim 10, wherein said composition is cured.

23. A thermoplastic elastomer composition according to claim 13, wherein said composition is cured.

24. A thermoplastic elastomer composition according to claim 15, wherein said composition is cured.

25. An uncured weatherstrip comprising the composition of claim 10.

26. An uncured weatherstrip comprising the composition of claim 15.

* * * * *